US009756019B2

(12) United States Patent
Warrick et al.

(10) Patent No.: US 9,756,019 B2
(45) Date of Patent: Sep. 5, 2017

(54) DNS-BASED CAPTIVE PORTAL WITH INTEGRATED TRANSPARENT PROXY TO PROTECT AGAINST USER DEVICE CACHING INCORRECT IP ADDRESS

(71) Applicant: Guest Tek Interactive Entertainment Ltd., Calgary (CA)

(72) Inventors: Peter S. Warrick, Calgary (CA); David T. Ong, Calgary (CA)

(73) Assignee: Guest Tek Interactive Entertainment Ltd., Calgary (CA)

( * ) Notice: Subject to any disclaimer, the term of this patent is extended or adjusted under 35 U.S.C. 154(b) by 275 days.

(21) Appl. No.: 14/279,008

(22) Filed: May 15, 2014

(65) Prior Publication Data
US 2014/0344890 A1 Nov. 20, 2014

Related U.S. Application Data

(60) Provisional application No. 61/824,246, filed on May 16, 2013.

(51) Int. Cl.
*H04L 29/06* (2006.01)
*H04L 29/12* (2006.01)

(52) U.S. Cl.
CPC ...... *H04L 63/0281* (2013.01); *H04L 61/1511* (2013.01); *H04L 63/0263* (2013.01); *H04L 63/08* (2013.01)

(58) Field of Classification Search
CPC . H04L 63/0263; H04L 63/0281; H04L 63/08; H04L 63/1511
See application file for complete search history.

(56) References Cited

U.S. PATENT DOCUMENTS 5,309,437 A 5/1994 Perlman et al.
5,420,862 A 5/1995 Perlman
(Continued)

FOREIGN PATENT DOCUMENTS

CA 2333495 7/2001
CN 102291268 12/2011
(Continued)

OTHER PUBLICATIONS

Office action mailed by Canadian Intellectual Property Office on Feb. 12, 2016 in counterpart Canadian patent application No. 2,851,709 (6 pages).

*Primary Examiner* — Michael Pyzocha
(74) *Attorney, Agent, or Firm* — ATMAC Patent Services Ltd.; Andrew T. MacMillan

(57) ABSTRACT

A captive portal system includes a login database, a web server, and a name server. The name server receives a DNS request from a user device, queries the login database to determine whether the user device is logged in, and responds to the DNS request with the IP address of the web server as a resolved IP address of the specified domain name when the user device is not logged in. The web server accepts a connection request from the user device to the IP address of the web server, receives an HTTP request specifying a non-local target URL from the user device, queries the login database to determine whether the user device is logged in according to the source address of the user device, and acts as a transparent proxy between the user device and the non-local target URL when the user device is logged in.

20 Claims, 7 Drawing Sheets

(56) References Cited

U.S. PATENT DOCUMENTS

| | | |
|---|---|---|
| 5,678,041 A | 10/1997 | Baker et al. |
| 5,708,780 A | 1/1998 | Levergood et al. |
| 5,761,683 A | 6/1998 | Logan et al. |
| 5,781,550 A | 7/1998 | Templin et al. |
| 5,802,320 A | 9/1998 | Baehr et al. |
| 5,805,803 A | 9/1998 | Birrell et al. |
| 5,812,776 A | 9/1998 | Gifford |
| 5,848,233 A | 12/1998 | Radia et al. |
| 5,901,287 A | 5/1999 | Bull et al. |
| 5,950,195 A | 9/1999 | Stockwell et al. |
| 5,958,015 A | 9/1999 | Dascalu |
| 6,092,196 A | 7/2000 | Reiche |
| 6,098,172 A | 8/2000 | Coss et al. |
| 6,112,212 A | 8/2000 | Heitler |
| 6,170,012 B1 | 1/2001 | Coss et al. |
| 6,636,894 B1 | 10/2003 | Short et al. |
| 6,779,118 B1 | 8/2004 | Ikudome et al. |
| 6,785,704 B1 | 8/2004 | McCanne |
| 6,820,133 B1 | 11/2004 | Grove et al. |
| 7,020,082 B2 | 3/2006 | Bhagavath et al. |
| 7,194,554 B1 | 3/2007 | Short et al. |
| 7,451,193 B1 | 11/2008 | Coile et al. |
| 7,542,468 B1* | 6/2009 | Begley ............... H04L 61/2015 370/389 |
| 7,689,716 B2 | 3/2010 | Short et al. |
| 7,877,783 B1 | 1/2011 | Cline et al. |
| 8,156,246 B2 | 4/2012 | Short et al. |
| 8,244,886 B2 | 8/2012 | Short et al. |
| 8,266,266 B2 | 9/2012 | Short et al. |
| 8,266,269 B2 | 9/2012 | Short et al. |
| 8,364,806 B2 | 1/2013 | Short et al. |
| 8,370,477 B2 | 2/2013 | Short et al. |
| 8,606,917 B2 | 12/2013 | Short et al. |
| 2001/0044825 A1 | 11/2001 | Barritz |
| 2003/0114157 A1 | 6/2003 | Spitz et al. |
| 2005/0235044 A1 | 10/2005 | Tazuma |
| 2006/0031436 A1 | 2/2006 | Sakata et al. |
| 2006/0056317 A1* | 3/2006 | Manning ............... H04L 29/06 370/254 |
| 2006/0101409 A1* | 5/2006 | Bemmel ............ H04L 63/0209 717/126 |
| 2007/0180147 A1 | 8/2007 | Leigh |
| 2009/0043900 A1* | 2/2009 | Barber ............. H04L 29/12066 709/228 |
| 2009/0112814 A1* | 4/2009 | Statia ............... H04L 29/12066 |
| 2009/0164597 A1* | 6/2009 | Shuster ........... H04L 29/12066 709/206 |
| 2010/0077450 A1* | 3/2010 | Hudis .................... G06F 21/34 726/3 |
| 2010/0095359 A1* | 4/2010 | Gordon ................. H04W 12/06 726/6 |
| 2011/0040867 A1* | 2/2011 | Kalbag ................. H04W 12/06 709/224 |
| 2011/0055912 A1* | 3/2011 | Fusari ............... G06F 17/30893 726/8 |
| 2011/0119306 A1* | 5/2011 | Patil ................. H04L 29/12066 707/783 |
| 2011/0154457 A1* | 6/2011 | Hamada ........... H04L 29/12066 726/6 |
| 2011/0264806 A1 | 10/2011 | Tuck et al. |
| 2011/0314149 A1 | 12/2011 | Manning et al. |
| 2012/0246553 A1* | 9/2012 | Ong ................. G06F 17/30867 715/234 |
| 2013/0055358 A1 | 2/2013 | Short et al. |
| 2013/0085914 A1* | 4/2013 | McPherson ......... H04L 61/1511 705/34 |
| 2013/0198383 A1* | 8/2013 | Tseng .................... H04L 63/102 709/225 |
| 2014/0059222 A1 | 2/2014 | Short et al. |
| 2014/0089661 A1* | 3/2014 | Mahadik ............. H04L 61/1511 713/162 |

FOREIGN PATENT DOCUMENTS

| | | |
|---|---|---|
| WO | 0004458 | 1/2000 |
| WO | 0131843 A2 | 5/2001 |
| WO | 0131886 A2 | 5/2001 |
| WO | 0149003 | 7/2001 |

\* cited by examiner (DNS operations)

(Login server operations)

(Login server operations)

(Login process)

Exemplary firewall/gateway rules 700

DNS rules 702

| Source IP address | Destination | Action |
|---|---|---|
| Client 1 (192.168.1.5) | DNS (port 53) | Forward to DNS-1 for logged in devices |
| Client 2 (192.168.1.99) | DNS (port 53) | Forward to DNS-1 for logged in devices |
| * | DNS (port 53) | Forward to DNS-2 for non-logged in devices |

710, 712

Internet access rules 704

| Source IP address | Destination | Action |
|---|---|---|
| Client 1 (192.168.1.5) | !192.*.*.* (Internet) | Allow |
| Client 2 (192.168.1.99) | !192.*.*.* (Internet) | Allow |
| * | 173.194.33.5 (cleared website 1) | Allow |
| * | 53.190.3.9 (cleared website 2) | Allow |
| * | !192.*.*.* (Internet) | Drop |

# DNS-BASED CAPTIVE PORTAL WITH INTEGRATED TRANSPARENT PROXY TO PROTECT AGAINST USER DEVICE CACHING INCORRECT IP ADDRESS

CROSS-REFERENCE TO RELATED APPLICATIONS

This application claims the benefit of priority of U.S. Provisional Patent Application No. 61/824,246 filed May 16, 2013 which is incorporated herein by reference.

BACKGROUND OF THE INVENTION (1) Field of the Invention

The invention pertains generally to captive portals. More specifically, the invention relates to a DNS-based captive portal with integrated transparent proxy to protect against a user's device caching an incorrect IP address.

(2) Description of the Related Art

The term "captive portal" generally refers to any technique that automatically forces a client device running a web browser to display a specially designated web page before being permitted to access a network such as the Internet in a normal manner.

Captive portals are often utilized in situations where it is required to force new users to view a login portal. For example, before allowing a guest in a hotel to surf the Internet, the guest may be required to log in at the hotel's login portal for billing and/or authentication purposes. Although it is possible to simply instruct users to manually navigate to a special Uniform Resource Locator (URL) or Internet Protocol (IP) address such as by placing instructional cards or brochures near network connection ports in the hotel room, a typical hotel guest would not read these instructions and instead expect the process to be fully automatic. A more user-friendly design presents the user with the login portal regardless of what web site the user may first try to load.

A known type of captive portal involves a domain name system (DNS) server resolving all domain names for unlogged in user devices to the IP address of a login portal. Essentially, the captive portal is performing DNS poisoning so that domain name requests from unlogged users are always resolved to the IP address of the hotel's login portal instead of the proper IP address of the requested website on the Internet. After the user device has logged in, the DNS server will begin to properly resolve domain name requests from the user device to their correct IP addresses using standard DNS techniques.

A first problem with a DNS-based captive portal is it will only work if the user initially attempts to browse to a URL with a domain name address and will not work if the user attempts to connect to a URL with a specific IP address. For example, if a non-logged in user at a hotel attempts to browse a website such as "http://5.6.7.1/index.html", unless the specified IP address matches that of the hotel's login portal, the user will not see the login portal. There is no way via the DNS protocol to cause the browser on the user's computer to display the login portal if the user device does not attempt to perform a domain name lookup.

A second problem with deliberately performing DNS poisoning for unlogged in user devices is that the user devices may cache the IP address of the login portal even after they are logged in. For example, if an unauthorized user device attempts to browse the website "example.com", the DNS server will provide the IP address of the login portal, for example, 192.168.1.1 because the user device is not yet logged in. After successfully logging in, when the user again attempts to browse the external website at "example.com", the user's device may directly attempt to connect to 192.168.1.1 without performing a new DNS query because the user device has cached this incorrect IP for the domain name "example.com".

A known solution to this problem involves configuring the DNS server of the captive portal to provide a low time-to-live (TTL) such as zero seconds when resolving domain names to the IP address of the login portal for unauthorized user devices. The TTL informs the user device of the time duration for which the provided IP address will be valid. Once the time duration specified by the TTL for a particular domain name expires, the user device should re-perform a DNS lookup for the next operation requiring the IP address of that particular domain name.

In theory, setting the TTL to zero seconds should completely prevent the user device from caching an incorrect IP address. However, in practice, there is no guarantee the user device will respect the TTL. Even if the underlying operating system on the user device does respect the TTL for a DNS-provided IP address, some applications running on the user's computer may keep their own cached IP addresses and not respect the TTL. For example, a web browser on the user device may cache mappings of domain names to IP addresses to avoid making repeated internal requests to the operating system running on the user device. Such caching action by the browser increases the speed at which websites render; however, it causes problems in a DNS-based captive portal because the browser may continue to connect with the IP address of the login portal for URLs involving domain names that were requested prior to successful login. In other words, for URLs requested prior to successful login, the browser will continue to display to the login portal even after the user has successfully logged in. To solve this problem, a user needs to either 1) wait some period of time until the browser automatically clears its internal cache of DNS-provided IP addresses, or 2) close and restart the browser, which will generally startup in a fresh state without any cached IP addresses.

BRIEF SUMMARY OF THE INVENTION

According to an exemplary embodiment of the invention there is disclosed a captive portal system for controlling access from user devices to an external network. The captive portal system includes a storage device storing a login database, the login database specifying source addresses of user devices that are currently logged in, a web server coupled to the storage device and a computer network, and configured with an IP address accessible on the computer network, and a name server coupled to the storage device and the computer network, for resolving domain names to IP addresses. The name server is configured to receive a DNS request from a user device to resolve a target domain name, query the login database to determine whether the user device is logged in according to a source address of the user device, respond to the DNS request with the IP address of the web server as a resolved IP address of the target domain name when the user device is not logged in, and respond to the DNS request with a correct IP address of the target domain name when the user device is logged in. The web server is configured to accept a connection request from the user device to the IP address of the web server, receive an HTTP request specifying a non-local target URL from the user device over the connection, wherein the non-local target}

URL is not a URL provided by the web server, query the login database to determine whether the user device is logged in according to the source address of the user device, respond to the HTTP request by acting as a transparent proxy between the user device and the non-local target URL to thereby allow the user device to receive the content of the non-local target URL when the user device is logged in, and respond to the HTTP request with alternate content different than that provided at the non-local target URL when the user device is not logged in.

According to another exemplary embodiment of the invention there is disclosed a method of controlling access from user devices to an external network. The method includes tracking in a login database source addresses of user devices that are currently logged in; receiving, by a name server, a DNS request from a user device to resolve a target domain name; and querying, by the name server, the login database to determine whether the user device is logged in according to a source address of the user device. The method further includes responding, by the name server, to the DNS request with the IP address of a web server accessible to the user device from within the captive portal as a resolved IP address of the target domain name when the user device is not logged in; responding, by the name server, to the DNS request with a correct IP address of the target domain name when the user device is logged in; and accepting, by the web server accessible to the user device from within the captive portal, a connection request from the user device to the IP address of the web server. The method further includes receiving, by the web server, an HTTP request specifying a non-local target URL from the user device over the connection, wherein the non-local target URL is not a URL provided by the web server; querying, by the web server, the login database to determine whether the user device is logged in according to the source address of the user device; responding, by the web server, to the HTTP request by acting as a transparent proxy between the user device and the non-local target URL to thereby allow the user device to receive the content of the non-local target URL when the user device is logged in; and responding, by the web server, to the HTTP request with alternate content different than that provided at the non-local target URL when the user device is not logged in.

According to yet another exemplary embodiment of the invention there is disclosed a non-transitory computer-readable medium comprising computer executable instructions that when executed by one or more computers cause the one or more computers to perform the above method of controlling access from user devices to an external network.

According to yet another exemplary embodiment of the invention there is disclosed a captive portal system for controlling access from user devices to an external network. The captive portal system includes means for tracking source addresses of user devices that are currently logged in; means for receiving a DNS request from a user device to resolve a target domain name; means for querying the login database to determine whether the user device is logged in according to a source address of the user device; and means for responding to the DNS request with the IP address of a web server accessible to the user device from within the captive portal as a resolved IP address of the target domain name when the user device is not logged in. The captive portal system further includes means for responding to the DNS request with a correct IP address of the target domain name when the user device is logged in; means for accepting a connection request from the user device to the IP address of the web server; means for receiving an HTTP request specifying a non-local target URL from the user device over the connection, wherein the non-local target URL is not a URL provided by the web server; and means for querying the login database to determine whether the user device is logged in according to the source address of the user device. The captive portal system further includes means for responding to the HTTP request by acting as a transparent proxy between the user device and the non-local target URL to thereby allow the user device to receive the content of the non-local target URL when the user device is logged in; and means for responding to the HTTP request with alternate content different than that provided at the non-local target URL when the user device is not logged in.

According to yet another exemplary embodiment of the invention there is disclosed a server in a captive portal system. The server includes a first network interface coupled to a local computer network, a second network interface coupled to an external computer network, and one or more processors. The one or more processors are configured to receive a DNS request from a user device on the local computer network to resolve a target domain name on the external computer network, query a login database to determine whether the user device is logged in at a time of the DNS request according to a source address of the user device, and respond to the DNS request with the IP address of the server as a resolved IP address of the target domain name when the user device is not logged in at the time of the DNS request. The one or more processors are further configured to respond to the DNS request with a correct IP address of the target domain name when the user device is logged in at the time of the DNS request, and accept a connection request from the user device on the local computer network to the IP address of the web server, the connection request coming sometime after the DNS request. The one or more processors are further configured to receive an HTTP request specifying a non-local target URL from the user device over the connection, wherein the non-local target URL is not a URL provided by the web server; query a login database to determine whether the user device is logged in at a time of the HTTP request according to the source address of the user device; and respond to the HTTP request by acting as a transparent proxy between the user device and the non-local target URL to thereby allow the user device to receive the content of the non-local target URL when the user device is logged in at the time of the HTTP request. The one or more processors are further configured to respond to the HTTP request with alternate content different than that provided at the non-local target URL when the user device is not logged in at the time of the HTTP request.

According to yet another exemplary embodiment of the invention there is disclosed a web server in a captive portal system. The web server includes a network interface coupled to a computer network and one or more processors configured to accept a connection request from the user device to the IP address of the web server; receive an HTTP request specifying a non-local target URL from the user device over the connection, wherein the non-local target URL is not a URL provided by the web server; query a login database to determine whether the user device is logged in according to the source address of the user device; respond to the HTTP request by acting as a transparent proxy between the user device and the non-local target URL to thereby allow the user device to receive the content of the non-local target URL when the user device is logged in; and respond to the HTTP request with alternate content different than that provided at the non-local target URL when the user device is not logged in.

According to yet another exemplary embodiment of the invention there is disclosed a method performed by a web server. The method includes accepting a connection request from a user device to an IP address of the web server; receiving an HTTP request specifying a non-local target URL from the user device over the connection, wherein the non-local target URL is not a URL provided by the web server; querying a login database to determine whether the user device is logged in according to the source address of the user device; responding to the HTTP request by acting as a transparent proxy between the user device and the non-local target URL to thereby allow the user device to receive the content of the non-local target URL when the user device is logged in; and responding to the HTTP request with alternate content different than that provided at the non-local target URL when the user device is not logged in.

According to yet another exemplary embodiment of the invention there is disclosed a non-transitory computer-readable medium comprising computer executable instructions that when executed by a computer cause the computer to perform the above method of the web server.

According to yet another exemplary embodiment of the invention there is disclosed a web server in a captive portal system. The web server includes means for accepting a connection request from a user device to an IP address of the web server; means for receiving an HTTP request specifying a non-local target URL from the user device over the connection, wherein the non-local target URL is not a URL provided by the web server; means for querying a login database to determine whether the user device is logged in according to the source address of the user device; means for responding to the HTTP request by acting as a transparent proxy between the user device and the non-local target URL to thereby allow the user device to receive the content of the non-local target URL when the user device is logged in; and means for responding to the HTTP request with alternate content different than that provided at the non-local target URL when the user device is not logged in.

According to yet another exemplary embodiment of the invention there is disclosed a name server in a captive portal system. The name server includes a network interface coupled to a computer network and one or more processors configured to receive a DNS request from a user device to resolve a target domain name; query the login database to determine whether the user device is logged in according to a source address of the user device and respond to the DNS request with a correct IP address of the target domain name when the user device is logged in; check whether the target domain name is a cleared site and respond to the DNS request with the correct IP address of the target domain name when the target domain name is a cleared site; and respond to the DNS request with the IP address of a web server accessible to non-logged in user devices from within the captive portal as a resolved IP address of the target domain name when the target domain name is not a cleared site and the user device is not logged in.

According to yet another exemplary embodiment of the invention there is disclosed a method performed by a name server in a captive portal system. The method includes receiving a DNS request from a user device to resolve a target domain name; receiving a DNS request from a user device to resolve a target domain name; querying the login database to determine whether the user device is logged in according to a source address of the user device and responding to the DNS request with a correct IP address of the target domain name when the user device is logged in; checking whether the target domain name is a cleared site and responding to the DNS request with the correct IP address of the target domain name when the target domain name is a cleared site; and responding to the DNS request with the IP address of a web server accessible to non-logged in user devices from within the captive portal as a resolved IP address of the target domain name when the target domain name is not a cleared site and the user device is not logged in.

According to yet another exemplary embodiment of the invention there is disclosed a non-transitory computer-readable medium comprising computer executable instructions that when executed by one or more computers cause the one or more computers to perform the above method of the name server.

According to yet another exemplary embodiment of the invention there is disclosed a name server in a captive portal system. The name server includes means for receiving a DNS request from a user device to resolve a target domain name; means for receiving a DNS request from a user device to resolve a target domain name; means for querying the login database to determine whether the user device is logged in according to a source address of the user device and responding to the DNS request with a correct IP address of the target domain name when the user device is logged in; means for checking whether the target domain name is a cleared site and responding to the DNS request with the correct IP address of the target domain name when the target domain name is a cleared site; and means for responding to the DNS request with the IP address of a web server accessible to non-logged in user devices from within the captive portal as a resolved IP address of the target domain name when the target domain name is not a cleared site and the user device is not logged in.

In an advantageous embodiment of the invention, a name server of a DNS-based captive portal provides the correct IP address of a requested domain name when either 1) the user device making the request is logged in, or 2) the requested domain name is on a list of cleared web sites; otherwise, the name server provides the IP address of an administrator specified web server. In an advantageous embodiment of the invention, a login web server of a DNS-based captive portal also acts as a transparent proxy for logged in user devices so that the logged in user devices can still access target URL(s) via HTTP and HTTPS even when they have cached the login server's IP address for the host domain of the target URL(s). These and other advantages of the present invention will no doubt become apparent to those of ordinary skill in the art after reading the following detailed description of the preferred embodiment that is illustrated in the various figures and drawings.

BRIEF DESCRIPTION OF THE DRAWINGS

The invention will be described in greater detail with reference to the accompanying drawings which represent preferred embodiments thereof.

FIG. 7 shows exemplary rules utilized to configure the firewall/gateway of FIG. 1 according to an exemplary embodiment of the invention.

DETAILED DESCRIPTION

Figure 1:
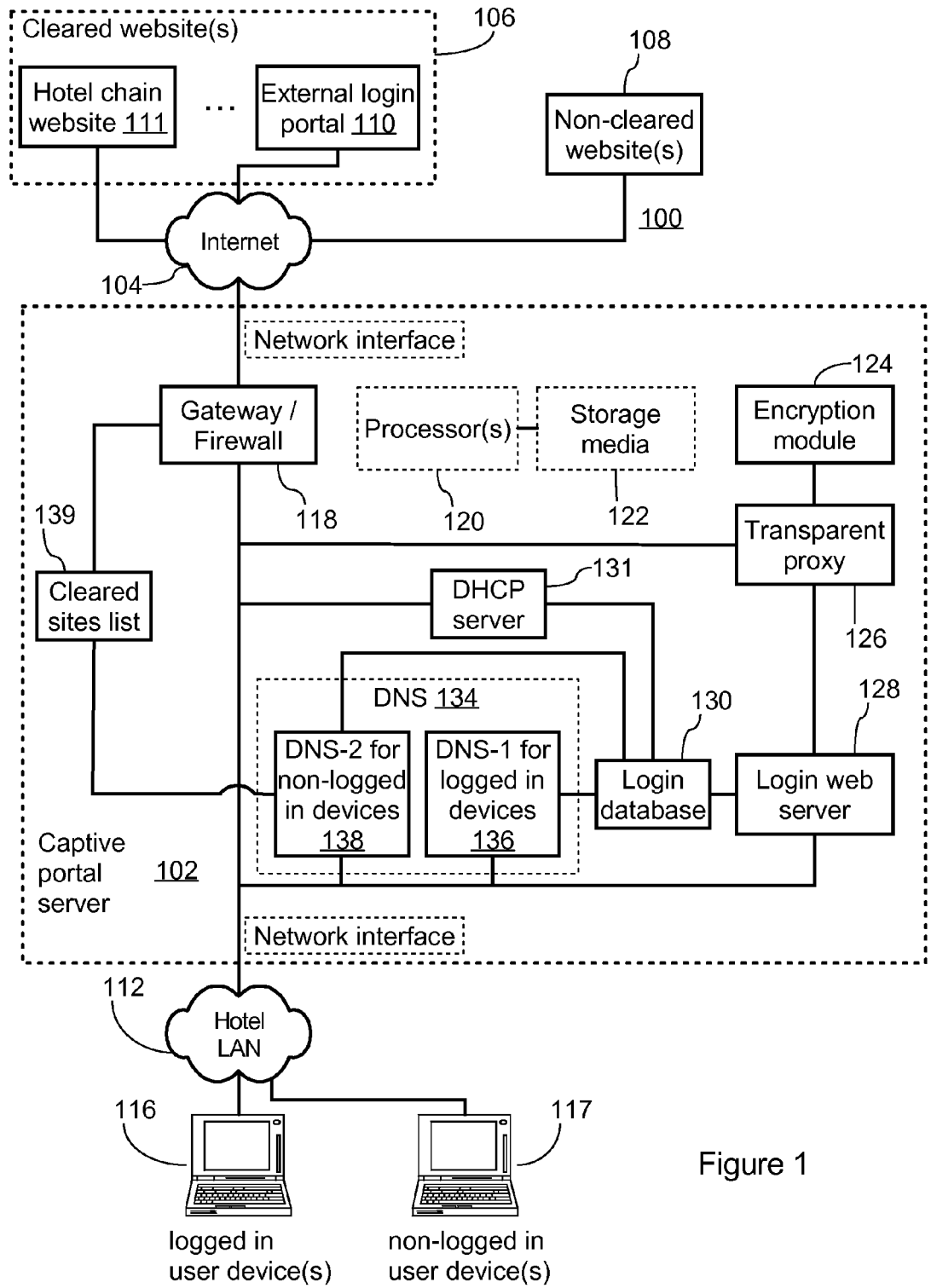
FIG. 1 shows a block diagram of a captive portal system according to an exemplary embodiment of the invention.

FIG. 1 shows a block diagram of a captive portal system 100 according to an exemplary embodiment of the invention. In this embodiment, the captive portal system 100 controls access to the Internet 104 for user devices 116, 117 operated by guests of a hospitality establishment such as a hotel.

The captive portal system 100 includes captive portal server 102 coupled between an external network such as the Internet 104 and a hotel local area network (LAN) 112. One or more cleared websites 106 and non-cleared websites 108 are coupled to the Internet 104. In this example, the cleared websites 106 include an external login portal 110 and a hotel chain website 111. One or more logged in user devices 116 and one or more non-logged in user devices 117 are coupled to the hotel LAN 112. The captive portal server 102 in this embodiment is a computer having one or more processors 120, which execute a computer program loaded from a non-transitory storage medium 122 such as a hard disk. The processors 120 are configured via the computer program to perform the functions of a gateway/firewall 118, a domain name system (DNS) server 134 including a first DNS 136 for logged in devices 116 and a second DNS 138 for non-logged in devices 117. The processors 120 are also configured via the computer program to perform the functions of a DHCP server 131, login web server 128, a transparent proxy 126, and an encryption module 124. The storage medium 122 or another storage device such a random access memory (RAM) also stores a cleared sites list 139 and a login database 130. In the following description, the plural form of the word "processors" is utilized as it is common for a central processing unit (CPU) of a computer server to have multiple processors (sometimes also referred to as cores); however, it is to be understood that a single processor may also be configured to perform the below-described functionality in other implementations.

Upon initial connection to the hotel LAN 112, a typical user device 116, 117 will utilize the dynamic host configuration protocol (DHCP) to automatically configure itself for the hotel LAN 104. DHCP is well-known in the art and involves the client device 138 sending various DHCP messages such as a "discover" and "request" in order to be assigned network settings for use on the hotel LAN 104. In response to these requests, the captive portal server 102 acts as a DHCP server 131 to dynamically assign the user device 116, 117 an IP address to use on the hotel LAN 102, to provide the user device 116, 117 with the IP address of the appropriate DNS server 134 to allow the user device to resolve domain names, and to provide the client device 138 with the IP address of the captive portal server 102 as the default gateway 118. For example, this step may be performed by the one or more processors 120 executing a DHCP server 131 module from the module storage media 122. Alternatively, another DHCP server on the hotel LAN 112 may perform these functions. Because the captive portal server 102 is set as the client device's default gateway 118, the client device 138 will send future IP packets having destinations off the hotel LAN 104 to the gateway 118 running on the captive portal server 104. In the following description, gateway and firewall functionality are both performed by the module 118 shown in FIG. 1 as the "gateway/firewall" 118; however, it is to be understood that the functionality of the gateway and firewall do not necessarily need to be performed by a single module and may be separated in other embodiments.

In a preferred embodiment, the DHCP server 131 (either implemented by the captive portal server 102 or another DHCP server on hotel LAN 112) provides all user devices, both logged in 116 and non-logged in 117, the same IP address of the captive portal's DNS server 134 for performing DNS lookups. As will be explained below with reference to the firewall rules in FIG. 6, logged in users devices 116 will have their DNS requests automatically forwarded by the firewall 118 to the first name server 136, and non-logged in user devices 117 will have their DNS requests automatically forwarded by the firewall 118 to the second name server 138. In an alternate embodiment, the DHCP server 131 may query the login database 130 to see if the requesting user device 116, 117 is already logged in according to the source address of the requesting user device. The DHCP server 131 then provides logged in user devices 116 with the IP address of the first name server 136 for DNS queries, and will provide non-logged in user devices 117 with the IP address of the second name server 138 for DNS queries.

As shown in FIG. 1, the captive portal server 102 includes a DNS server 134 comprised of two name servers 136, 138. One function of the DNS server 134 is to resolve all DNS requests by non-logged in user devices 117 for non-cleared external domain names (corresponding to non-cleared websites 108) to the IP address of the login web server 128. The non-logged in user device 117 will then establish a connection to the login server 128's IP address directly, and the login server 128 accepts the incoming connection and receives a normal HTTP request from the non-logged in user device 117 over the connection. In response to the HTTP request, the login web server 128 provides alternate content to the user device 117 such as a button for the user to click in order to proceed to the login portal start page. The start page may be accessed via HTTPS to protect the confidentiality of user information.

Once a non-logged in user device 117 is logged in and becomes a logged in user device 116, all DNS requests from the logged in user device 116 are handled by the DNS server 134 in the manner of a typical DNS server so that the user device 116 receives the actual (i.e., correct) IP address for all target domain names including those for the non-cleared web sites 108.

Because a logged in user device 116 or applications running thereon may still cache the IP address of the login web server 128 for a target (non-cleared) URL, the login web server 128 is further configured to act as a transparent proxy 126 for both HTTP and HTTPS requests from logged-in user devices 116. In this way, even though a logged in user device 116 may improperly cache the login server 128's IP address (i.e., an incorrect IP address) for a particular domain name, the user device 116 can still access web content at that particular domain name after successfully logging in.

Figure 2:
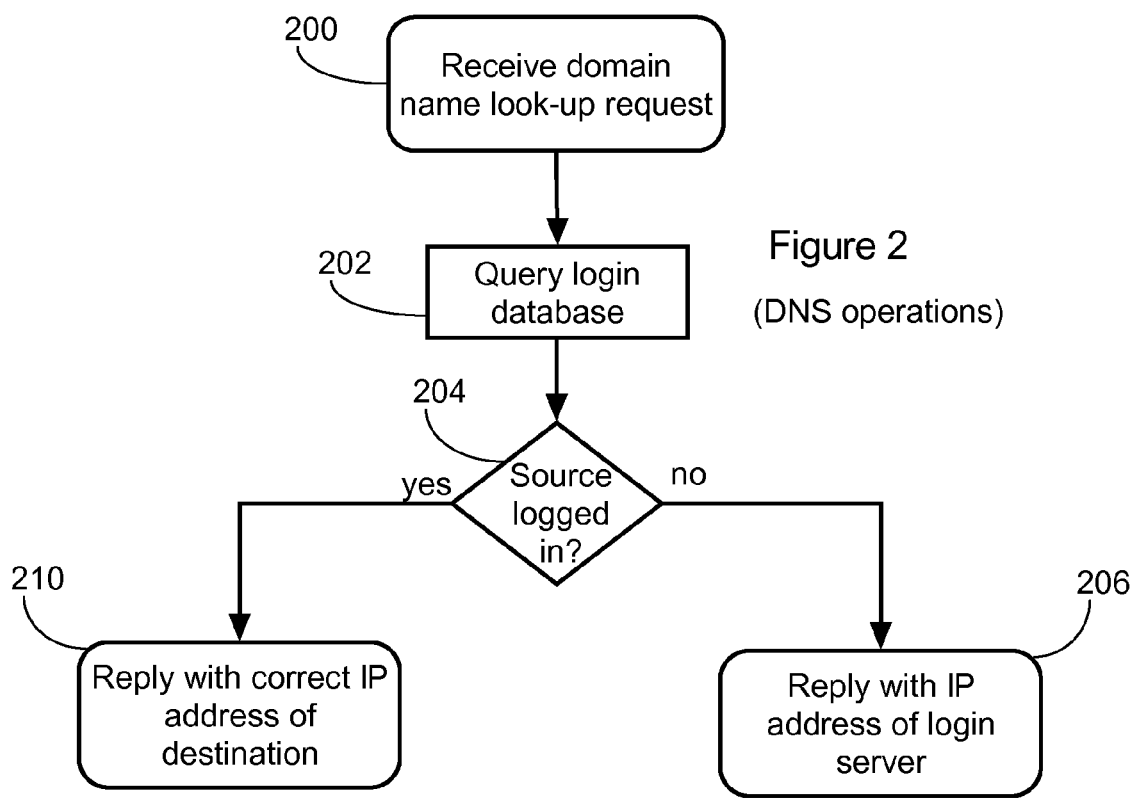
FIG. 2 shows a flowchart of operations performed by the domain name system (DNS) server of FIG. 1 according to an exemplary embodiment of the invention.

FIG. 2 shows a flowchart of operations performed by the domain name system (DNS) server 134 of FIG. 1 according to an exemplary embodiment of the invention. With reference to FIG. 1, the steps of FIG. 2 are performed by the processors 120 of the captive portal server 102, or, in another embodiment, the steps may be performed by one or more processors of a standalone DNS server 134. The steps of the flowchart are not restricted to the exact order shown, and, in other configurations, shown steps may be omitted or other intermediate steps added. In this embodiment, the name server 134 performs the following steps:

At step 200, the DNS server 134 on the hotel LAN 112 receives a DNS query from a user device 116, 117 at the hotel.

At step 202, the DNS server 134 queries the login database 130 to determine whether the source user device 116, 117 from which the request was received at step 200 is logged in or not. The Ethernet frames and IP packets carrying the DNS request received at step 200 will specify the source MAC/IP addresses of the user device 116, 117 that made the request. Using this information, the DNS server 134 can query the login database 130 to determine whether there is a currently logged in user device 116 that has a matching source address. Either the MAC or IP address of the user device 116 could be used as the source address in different embodiments.

At step 204, control proceeds to step 210 when the source user device 116 is already logged in; alternatively, control proceeds to step 206 when the source user device 117 is not logged in.

At step 206, because the source user device 117 is not yet logged in, the DNS server 134 replies to the DNS request with the IP address of the login web server 128 as the resolved IP address. To reduce the need for the login server 128 to act as the transparent proxy 126 for logged in user devices 116, the second name server 138 should set a short time-to-live when resolving a URL to the IP address of the login server 128 for non-logged in user devices 117. For example, the TTL of the IP address of the login web server 128 provided in the DNS response by the second name server 138 at step 206 can be set to zero seconds.

At step 210, because the source user device 116 is already logged in, the DNS server 134 replies to the DNS request with the correct IP address of the target domain name using the standard, well-known DNS techniques.

The DNS server 134 on hotel LAN 112 is customized to resolve all domain names to the IP address of the login server 128 for requests from non-logged in user devices 117, and to resolve domain names to their correct IP addresses for requests from logged in user devices 116.

In this embodiment, the DNS server 134 is actually composed of two name servers: a first name server 136 for logged in user devices 116 (step 210); and a second name server 138 for non-logged in devices 117 (step 206). Separating the DNS server 134 into two different name servers 136, 138 is beneficial because a standard, off-the-shelf DNS server can be utilized for the first name server 136 handling the logged in user devices 116. The bulk of DNS requests received at step 200 will be handled by the first name server 136 and will be handled very efficiently because the first name sever 136 is simply a standard DNS server. In this embodiment, the second name server 138 for handling DNS requests received from non-logged in devices 117 (step 206) is similar to a DNS black hole that will resolve all (or most) target domains to the IP address of the login server 128. Forwarding of DNS requests from logged in user devices 116 and non-logged in user devices 117 to the appropriate one of the two name servers 136, 138 can be performed by the firewall 117. In another embodiment, the two DNS servers 136, 138 can be implemented as a single DNS 134 having different actions depending on the logged in status of the source user device 116.

Figure 3:
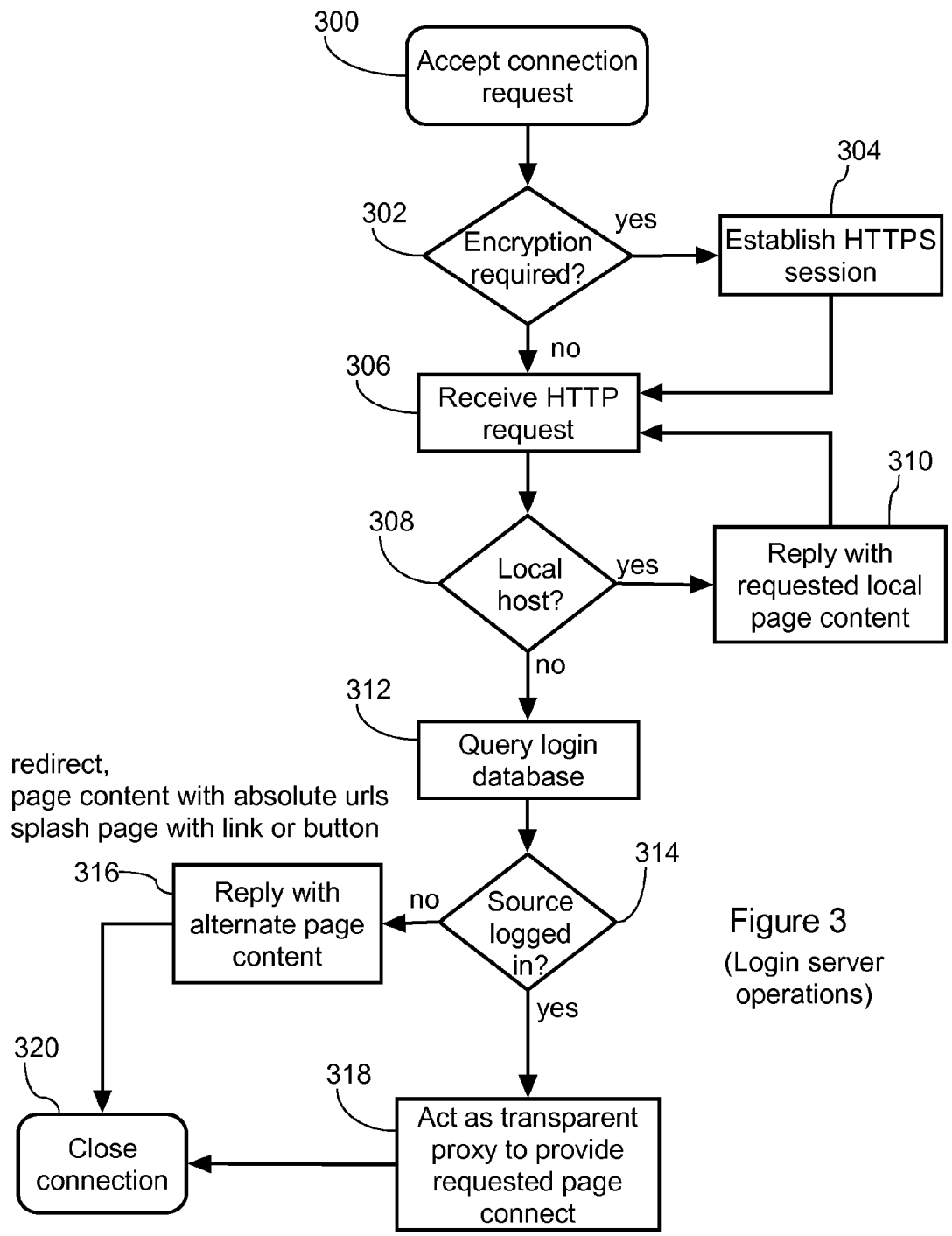
FIG. 3 shows a flowchart of operations performed by the login server and integrated transparent proxy of FIG. 1 according to an exemplary embodiment of the invention.

FIG. 3 shows a flowchart of operations performed by the login server 128 and integrated transparent proxy 126 of FIG. 1 according to an exemplary embodiment of the invention. With reference to FIG. 1, the steps of FIG. 3 are performed by the processors 120 of the captive portal server 102, or, in another embodiment, the steps may be performed by one or more processors of a standalone web server 128, transparent proxy 126, and/or encryption module 124. The steps of the flowchart are not restricted to the exact order shown, and, in other configurations, shown steps may be omitted or other intermediate steps added. In this embodiment, the login web server 128 performs the following steps:

At step 300, the web server 128 receives and accepts a TCP connection request from a user device 116, 117. The connection request received at this step has a destination IP address matching that assigned to the web server 128 and a source IP address matching that assigned to the user device 116, 117 making the request (e.g., preassigned via a DHCP process upon its first connection to hotel LAN 112). In another embodiment, the source MAC address of the user device 116, 117 making the request could be utilized as a device identifier.

At step 302, control proceeds to step 304 if encryption is required such as in an HTTP Secure (HTTPS) session. Alternatively, if no encryption is required, control proceeds to step 306. Typically the web server 128 will receive regular HTTP requests over a TCP connection established on port 80 and encrypted HTTPS requests over a secure connection established on port 443.

At step 304, the web server establishes the secure connection using the SSL/TLS protocol as is well-known in the art; further description of this step is omitted for brevity.

At step 306, the web server 128 receives an HTTP request from the user device 116, 117 over the established TCP connection (e.g., either secure via port 443 or unsecured over port 80).

At step 308, the web server 128 examines the destination "host" field in the HTTP request header to determine whether the HTTP request is directed at the login web server 128 itself. The "host" header field is mandatory since HTTP/1.1 and specifies the domain name of the server and optionally the TCP port number on which the destination server is listening. When the value of the "host" field in the HTTP request matches the assigned domain name of the login web server 128 itself, the target host is deemed to be the local host and control proceeds to step 308 to return the specified web content. Alternatively, when the value of the "host" field in the incoming HTTP request does not match the assigned domain name of the login web server 128, this means that the login web server 128 has received the HTTP request even though the login web server 128 does not provide the requested content. In this situation control proceeds to step 312.

At step 310, the web server 128 replies to the HTTP request with the requested local page content as specified in the HTTP request (e.g., the desired content link will be specified in HTTP requests using the GET method.) This step constitutes the typical action of a web server and is well known in the art.

Examples of local content that may be returned at this step include pages of the login portal provided by the login web server. Credit card or other payment details may also be accepted using local pages on the web server 128 and the user may have to agree to terms and conditions as displayed to the user on various local web pages sent to the user at this step 308. Since several HTTP requests may be received over the same TCP connection, in a preferred embodiment the web server 128 does not close the connection with the user device after replying with the requested local page content at this step. Control proceeds back to step 306 to receive another HTTP request over the connection with the user device 116, 117. In another embodiment, the server 128 simply closes the connection after step 310 instead of proceeding back to step 306.

At step 312, the web server 128 queries the login database 130 in order to determine whether the source user device 116, 117 from which the HTTP request was received at step 306 is logged in or not. Similar to as previously described for step 202 of FIG. 2, the Ethernet frames and IP packets carrying the HTTP request received at step 306 will specify the source MAC/IP addresses of the user device 116, 117 that made the request. Using this information, the web server 128 can query the login database 130 to determine whether there is a currently logged in user device 116 that has a matching source address. Either the MAC or IP address of the user device 116 could be used as the source address in different embodiments.

At step 314, control proceeds to step 318 when the source user device 116 is already logged in. This situation occurs when a logged in user device 116 mistakenly caches the IP address of the login web server 128 (i.e., an incorrect IP address) for another host's domain name. Alternatively, if the source user device 117 is not logged in, control proceeds to step 316. This situation occurs as a result of the domain names for all non-cleared websites being resolved by DNS server 134 to the IP address of the login web server 128.

At step 316, the web server replies to the non-logged in user device 117 with alternate page content even though the user device 117 is requesting content on another web host. The purpose of the alternate content is to cause the non-logged in user device 117 to display captive portal screens rather than the requested content on the target host as specified in the HTTP request. Examples of alternative content that could be generated and/or sent to the user device 117 by the web server 128 at this step include: a browser redirection message causing a web browser running on the non-logged in user device 117 to automatically redirect to a first page of the login portal on either the internal login web server 128 or the external login portal 110; web page HTML content cause the web browser running on the non-logged in user device 117 to display a first screen of either login portal 128, 110; and/or a splash page with a button or link visible for the user to click in order to manually cause their web browser to proceed to the first screen of the login portal 128, 110.

Because the alternate content served by the web server 128 at step 316 is not the real content that will become available to the user device 117 at the desired external web server host after successful login, the web server 128 adds various headers to prevent the user device 117 from caching the alternate content. To prevent the user device 117 from incorrectly caching the alternate content sent as that of the requested web page, the web server 128 includes a cache-control header in the HTTP response having one or more directives set to prevent caching. Because not all browsers recognize or respond correctly to all cache-control directives, the HTTP response header may be set to include multiple cache control directives such as: "Cache-Control: no-cache, no-store, max-age=0, must-revalidate". Other combinations of one or more cache-control directives may also be used to prevent the browser running on the client device 138 from caching the modified HTML content sent at this step.

In another example, rather than (or in addition to) the cache-control HTTP header added to the HTTP response at step 316, the web server 128 may also modify the alternate HTTP content sent at this step to further include an HTML no-cache meta tag. Similar to the HTTP header, the purpose of the no-cache meta tag is to instruct the browser running on the non-logged in user device 117 not to cache the alternate content sent at this step as the content of the user-requested web page.

Any alternate page content could be generated and sent to the non-logged in user device 117 at step 316. The alternate content will generally be different than what the user would have received from the target URL had the user been logged in. Further examples of alternate content include:

a splash screen with a button or link for the user to click to proceed to the first page of the login process on the login server 128 the first page of the login process on the login server 128 the first page of any desired website (e.g., login page or cleared website 106)

a browser redirection message to any desired website (e.g., login page or cleared website 106)

Concerning the alternate content generated and provided by the web server 128 at step 316, the alternate content could also be generated similar to how the first screen of content is generated by the captive portal server described by co-inventor David Ong in U.S. Pat. No. 8,650,495 issued Feb. 11, 2014 and U.S. Patent Publication No. 20140090030 published Mar. 27, 2014 (both entitled, "CAPTIVE PORTAL THAT MODIFIES CONTENT RETRIEVED FROM DESIGNATED WEB PAGE TO SPECIFY BASE DOMAIN FOR RELATIVE LINK AND SENDS TO CLIENT IN RESPONSE TO REQUEST FROM CLIENT FOR UNAUTHORIZED WEB PAGE"), which are both incorporated herein by reference. Briefly described, relative links in the content of a particular web page can be converted by the login web server 128 into absolute links to reduce load on the login server 128 acting as a transparent proxy for future requests. See the above-identified captive portal server patent and publication by David Ong for more information.

At step 318, because the user device 116 that made the HTTP request is already logged in, the web server 128 acts as a transparent proxy between the user device 116 and the target host specified in the HTTP request. The purpose of the this step is to ensure that a logged in user device 116 that has cached the IP address of the login server 128 for the domain name of the host will still be able to access content on that host.

At step 320, substantially immediately after sending either the alternate content at step 316 or acting as a transparent proxy for a single HTTP-request-response transaction at step 318, the web server 128 closes the connection with the user device 116, 117. To increase subsequent page load speeds from a web server, typical web browsers will hold the connection to the web server in an open state using various keep-alive techniques. The goal of holding the connection open is that future HTTP requests to the same server will not need to first open a TCP connection, thereby saving the time related to the connection setup. For example, a typical user device 116, 117 will try to request all the images, scripts, CSS files, and other content required to display the designated web page over the same connection. In order to force the user device 116, 117 to open a new connection for subsequent HTTP requests to gather these content elements, after either sending the alternate content at step 316 or acting as the transparent proxy for a single request-response transaction at step 318, the captive portal server 102 deliberately closes the TCP connection with the client device 138.

When reaching step 320 from step 318, closing the connection for the logged-in user device 116 may allow the browser running the logged in user device 116 to clear its cached IP address (either internal timer on browser cache runs out or the act of the connection closing possibility triggers the cache to clear). If the browser clears the cached IP address of the login server, then a next HTTP request for the target host will trigger a new DNS request and, as a result of the user device now being logged in, the DNS server 134 will provide the user device with the correct IP address of the target host (step 210). In this way, closing the connection by the web server 128 at step 320 before a subsequent HTTP request is received from a logged in user device 116 potentially reduces the load on the web server 128 acting as the transparent proxy 126.

If a non-logged in user device 117 initially tries to visit an HTTPS URL, the user must add a certificate exception in their browser in order to get to the login screen provided by the login web server 128. This certificate exception requirement also exists when using TCP connection handshake IP spoofing techniques by an intermediate gateway in other prior art captive portal configurations so this is not a new problem unique to DNS-based captive portals. However, the DNS-based captive portal of this embodiment of the present invention uses the certificate exception to its advantage while acting as the transparent proxy at step 318. In the situation where the user's logged in computer 116 has cached the IP address of the login server 128 for an HTTPS URL, the certificate of the login server 128 has already been accepted by the user and the login server 128 is therefore able to establish a secure connection, receive an HTTP request over that secure connection, and see the destination "host" and other headers of the HTTP request even though it is being transmitted in using HTTPS.

To act as a transparent proxy 124 for HTTPS, the web server 128 uses man-in-the-middle techniques to decrypt and re-encrypt HTTPS sessions on both sides of the transaction. This works on the user side without any warnings to the user because the user already added a certificate exception to their browser when they initially went to login server 128 before their user device 117 was logged in. Therefore, even though the now logged in user device 116 is making a request to a destination URL encrypted in an HTTPS request, the user's browser will accept and establish an encrypted session with the login web server 128 because the browser has already added a certificate exception. The web server 128 can thereby read the HTTP request headers and find out the target URL in order to perform transparent proxying 126. Similarly, the transparent proxy 126 can establish an HTTPS connection with the desired host (e.g., a non-cleared website 108) on behalf of the user device and simply pass requests and responses back and forth between the encrypted sessions with both these devices (e.g., user device 116 and non-cleared host 108).

Often within a captive portal environment there will be some cleared websites 106 on the Internet 104 that are to be made freely accessible from within the walled garden even for non-logged in user devices 117. In FIG. 1, the cleared websites 106 are listed on the cleared sites list 139, which is stored in a storage device such as a hard drive or other storage medium 122.

Figure 4:
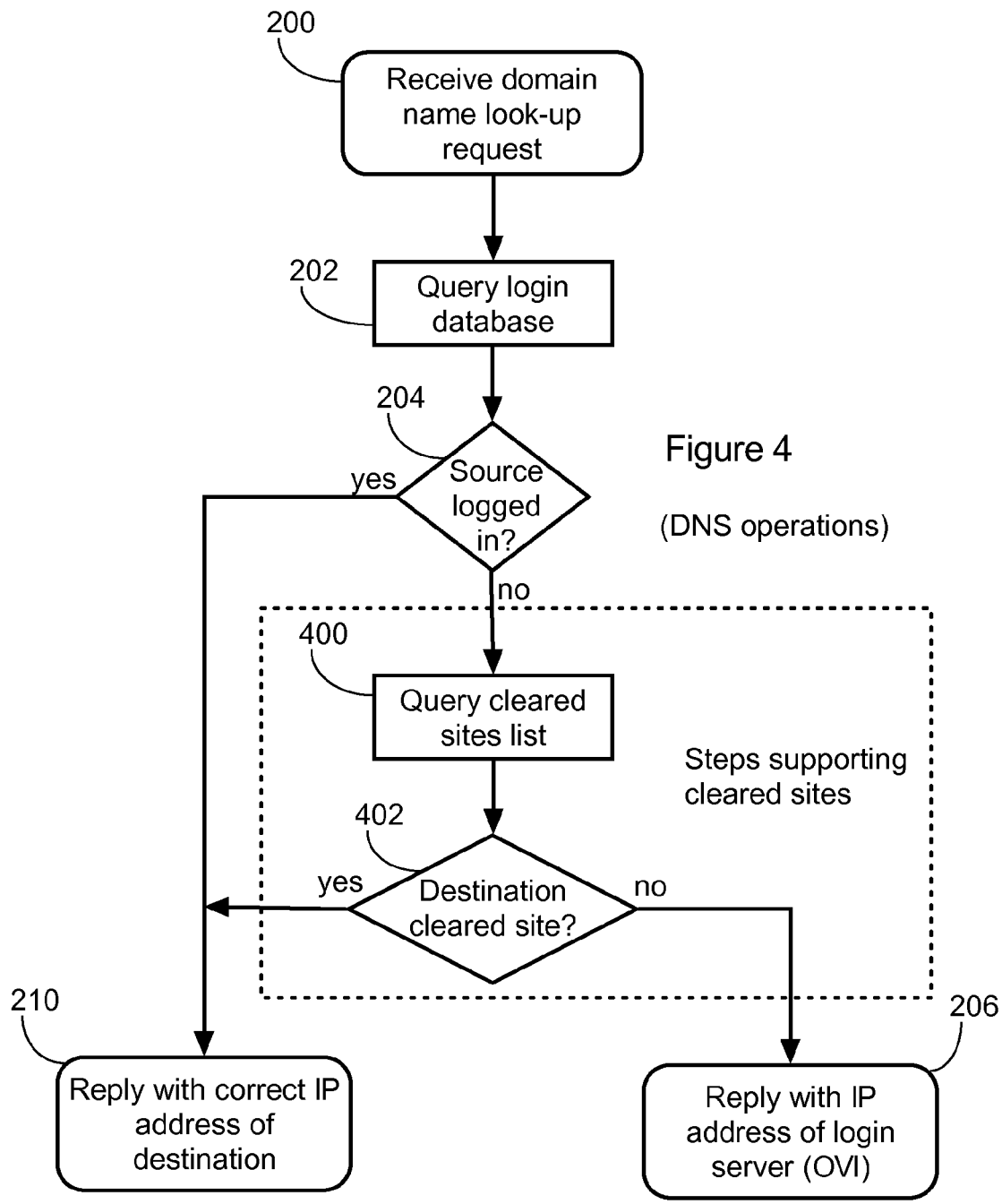
FIG. 4 shows a flowchart of operations performed by the domain name system (DNS) server of FIG. 1 in order to allow free websites according to an exemplary embodiment of the invention.

FIG. 4 shows a flowchart of operations performed by the domain name system (DNS) server 134 of FIG. 1 in order to allow free websites according to an exemplary embodiment of the invention. In order to support free websites 106, the operation of the DNS name server 134 is modified to include new steps 400 and 402 as follows.

When the DNS request is determined to have been received from a non-logged in user device 117 at step 204, control proceeds to new step 400 to query the cleared sites list 139. The purpose of this query is to check whether the target domain name in the DNS request matches one of the cleared websites 106 specified on the cleared sites list 139. When yes, control proceeds from new step 402 to step 210 to reply with the correct IP address of the destination. Alternatively, when no, control proceeds from new step 402 to step 206 to reply with the IP address of the login web server 128 as the resolved IP address. In this way, even non-logged in user devices 117 will be able to properly resolve the IP addresses of cleared web sites 106 listed on the cleared sites list 139.

In some applications, cleared/free websites on the cleared sites list 139 need to be cleared at the DNS server so that regardless of whether the user's computer is logged in or not they will always get the true (i.e., correct) IP address of a cleared website. The DNS server 134 modification of FIG. 4 may be suitable for such applications.

Figure 5:
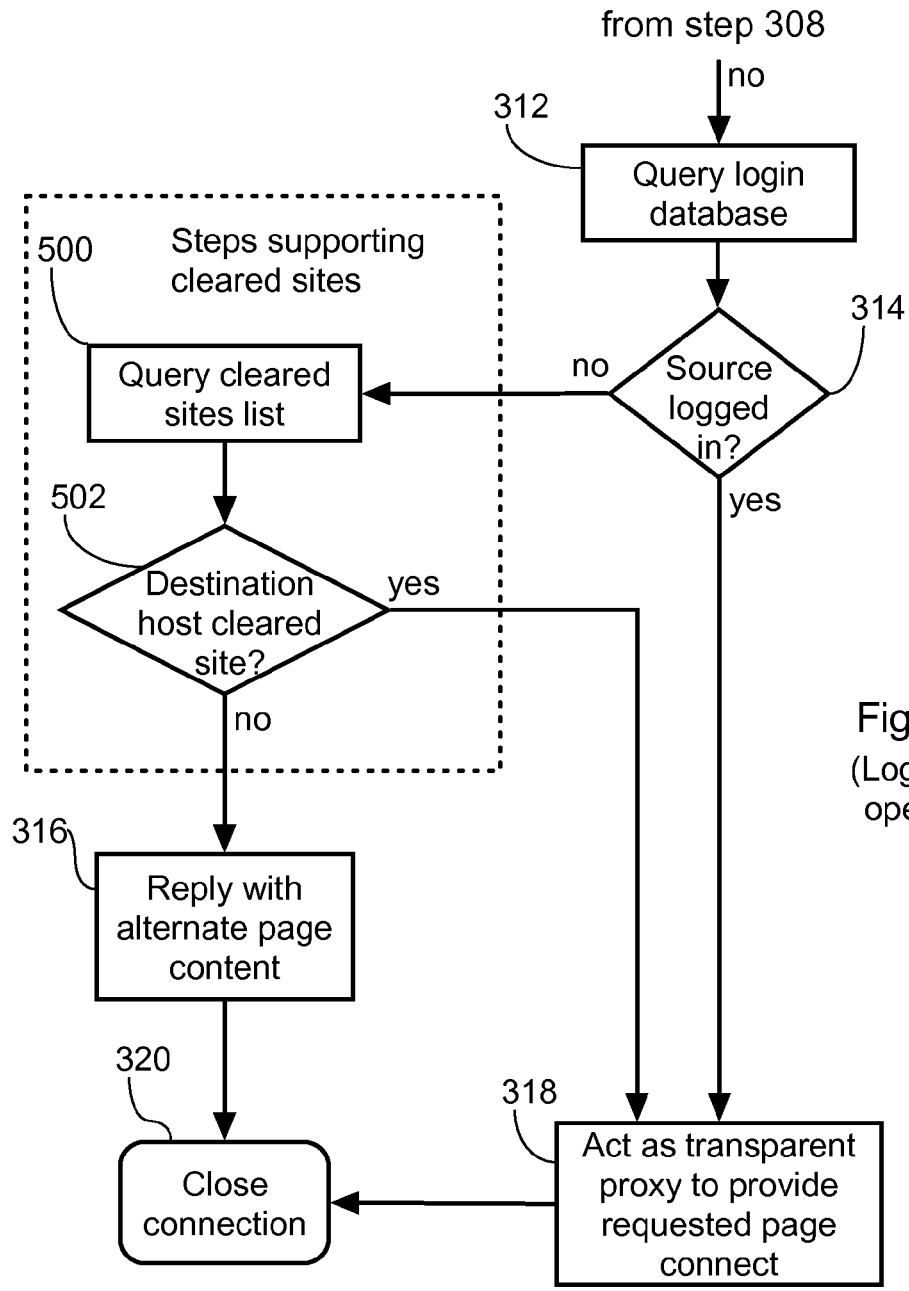
FIG. 5 shows a flowchart of operations performed by the login web server of FIG. 1 in order to allow free websites according to an exemplary embodiment of the invention.

FIG. 5 shows a flowchart of operations performed by the login web server 128 of FIG. 1 in order to allow free websites according to an exemplary embodiment of the invention. In order to support free websites 106, the operation of the web server 128 is modified to include a new steps 500 and 502 as follows:

When the HTTP request is determined to have been received from a non-logged in user device 117 at step 314, control proceeds to new step 500 to query the cleared sites list 139. The purpose of this query is to check whether the target host field in the HTTP request header matches one of the cleared websites 106 specified on the cleared sites list 139. When yes, control proceeds from new step 502 to step 318 to act as a transparent proxy between the non-logged in user device 117 and the cleared website 108. Alternatively, when no, control proceeds from new step 502 to step 316 to reply with alternate page content such as the first page of the login portal. In this way, non-logged in user devices 117 will be able to browse cleared web sites 106 listed on the cleared sites list 139 even if the user device 117 mistakenly sends its HTTP request to the IP address of the login web server 128.

To support cleared websites, either the DNS server 134 or the login web server 128 may have its operation modified in different embodiments in the manner shown in FIGS. 4 and 5, respectively. Alternatively, the functionality of both the DNS server 134 and the login web server 128 may be modified in a single embodiment in the manner shown FIGS. 4 and 5, respectively.

The above embodiment of the firewall/gateway rules 700, the second name server 138 operation for the cleared sites list 139, and the login web server 128 is also compatible with the smart walled garden by co-inventor David Ong described in U.S. Pat. No. 8,448,231 issued May 21, 2013 (entitled, "WALLED GARDEN SYSTEM FOR PROVIDING ACCESS TO ONE OR MORE WEBSITES THAT INCORPORATE CONTENT FROM OTHER WEBSITES AND METHOD THEREOF") and U.S. Patent Publication No. 20130239199 published Sep. 12, 2013 (entitled, "WALLED GARDEN PROVIDING ACCESS TO ONE OR MORE WEBSITES THAT INCORPORATE CONTENT FROM OTHER WEBSITES"), which are both incorporated herein by reference. The teachings of these applications can be utilized herein to handle the cleared sites list 139, add corresponding website-specific Internet access rules 722, and ensure that these cleared websites 106 also work when incorporating material from other non-cleared websites 108 via the operation of transparent proxy 126. Briefly described, the login portal 138 will also act as a transparent proxy 126 for a non-logged in user device 117 when the referrer header of the incoming HTTP request indicates one of the websites on the cleared sites list 139. See the above-identified smart walled garden patent and publication by David Ong for more information.

Figure 6:
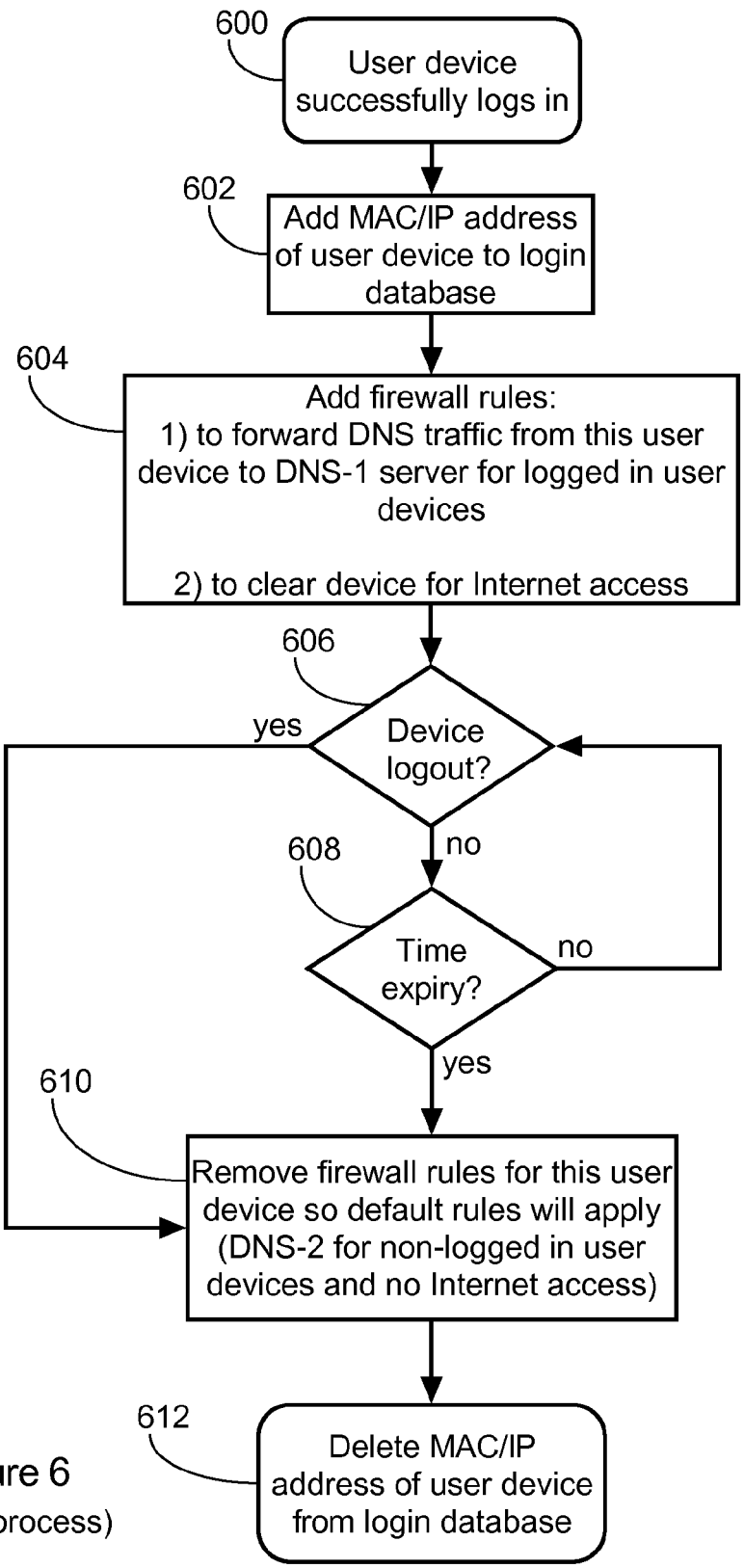
FIG. 6 shows operations of the login server of FIG. 1 in order to log in a user device, set up various rules in the firewall/gateway, and add the device identifier to the login database according to an exemplary embodiment of the invention.

FIG. 6 shows operations of the login web server 128 of FIG. 1 in order to log in a user device 117, setup various rules in the firewall/gateway 118, and add the device identifier to the login database 130 according to an exemplary embodiment of the invention. With reference to FIG. 1, the steps of FIG. 6 are performed by the processors 120 of the captive portal server 102, or, in another embodiment, the steps may be performed by one or more processors of a standalone web server 128. The steps of the flowchart are not restricted to the exact order shown, and, in other configurations, shown steps may be omitted or other intermediate steps added. In this embodiment, the web server 128 performs the following steps:

At step 600, a non-logged in user device 117 successfully logs in and thereby becomes a logged in user device 116. In some embodiments the act of logging in may simply consist of the user accepting terms and conditions in order to access the Internet 104 through the captive portal server 102. In other embodiments, the act of logging in may require payment information or username/password authentication. The steps required to successfully log in a user device 117 depend on the application-specific requirements and are known in the art; further description is therefore omitted herein for brevity.

At step 602, the web server 128 adds a device identifier of the now logged in user device 116 to the login database 130. For example, the device identifier may correspond to the MAC and/or IP address of the user device 116 as determined by the login web server 128 inspecting Ethernet frames and/or TCP/IP packets received from the user device 116.

At step 604, the web server 128 adds two sets of firewall rules: a first to forward all DNS traffic from the now logged in user device 116 to the first name server 136, and a second to clear network traffic from the now logged in user device 116 for transmission to the Internet 104.

FIG. 7 shows exemplary DNS rules 702 and Internet access rules 704 utilized to configure the firewall/gateway 118 of FIG. 1 according to an exemplary embodiment of the invention.

As shown in FIG. 7, the DNS rules 702 include a number of device-specific DNS rules 710. Each of the device-specific DNS rules 710 forwards DNS requests (to destination port 63) from a specific logged in user device 116 to the first name server 136. In this way, as a result of step 210 in FIG. 2 (and/or FIG. 4), each of the logged in user devices 116 will be able to resolve the correct IP addresses websites on the Internet 104 such as the non-cleared websites 108. The DNS rules 702 also include a default DNS rule 712, which forwards all DNS requests from all other (i.e., non-logged in) user devices 117 to the second name server 138. In this way, as a result of step 206 in FIG. 2 (and/or FIG. 4), each of the non-logged in user devices 117 will have all DNS requests resolved to the IP address of the login web server 128. As previously explained, the DNS server 134 may actually resolve the correct IP addresses for the IP address of a domain corresponding to a cleared web site 108 even for non-logged in user devices 117, for example, see steps 400 and 402 in FIG. 4.

According to the DNS rules 702, logged in user devices 116 have their DNS traffic redirected to the first name server 136, whereas DNS traffic from non-logged in user devices 117 is sent to the second name server 138. In this embodiment, the first name server 136 is a regular DNS server that provides correct global IP addresses for target domain names, and the second name server 138 is a special DNS server that only provides correct global IP addresses for target domain names that match those on the cleared sites list 139. For all non-cleared websites 108 (i.e., all websites not specifically listed on the cleared sites list 139), the second name server 138 provides the IP address of the login web server 128 regardless of the target domain name specified in the DNS request.

The Internet access rules 704 include a number of device-specific Internet access rules 720. Each of the device-specific Internet access rules 720 allows a particular logged in user device 116 to access any non-local IP address such as all websites on the Internet 104. The Internet access rules 704 also include a number of website-specific Internet access rules 722. Each of the website-specific Internet access rules 722 allows all logged in and non-logged in user devices 116, 117 to access the particular IP address of the website. Website-specific Internet access rules 722 are utilized in conjunction with the cleared sites list 139 so that non-logged in user devices 117 are enabled to access the IP addresses of the cleared websites 108. There is one website-specific Internet access rule 722 for the IP address of each specific website on the cleared sites list 139. The Internet access rules 704 further include a default Internet access rule 724, which blocks all outgoing Internet traffic if one of the proceeding rules does not apply. In this way, all non-logged in user devices 117 are blocked from accessing websites on the Internet 108 unless the destination IP address corresponds to a cleared website 108 specified on the cleared sites list 139.

Returning again to the description of FIG. 6, at step 606 the login web server 128 checks to see whether the logged in user device 116 has been logged out by the user; if yes, control proceeds to step 610; otherwise, control proceeds to step 608.

At step 608, the login web server 128 checks to see whether an allocated time duration has expired for the logged in user device 116. In some embodiments, a user device may be logged in for a predetermined time duration such as one hour or one day. After the time duration has expired, the logged in user device 116 is automatically logged out and becomes a logged out user device 117. The time duration checked at this step may be predetermined based upon the payment options selected and made by the user during the login process at step 600. When the login time duration has expired, control proceeds from step 608 to step 610; otherwise, control returns to step 606 to check for user logout before the time expiry.

At step 610, the login web server 128 removes the various device-specific rules for the now logged out user device 117 from the firewall/gateway 118. With reference to the exemplary firewall/gateway rules 702 shown in FIG. 7, the web server 128 removes the device-specific DNS rule 710 and the devices-specific Internet access rule 720 that correspond to the source IP address of the now logged out user device 117. In this way, the default DNS rule 712 and the default Internet access rule 724 apply for the newly logged out user device 117. The newly logged out user device 117 will therefore no longer be able to resolve the IP address of non-cleared websites 108 on the Internet 104 and will no longer be able to send traffic to non-cleared websites 108 on the Internet 104 (even if the user device 117 already has cached the IP addresses of the non-cleared websites 108).

At step 612, the login web server 128 deletes the record of the newly logged out user device 117 from the login database 130 to thereby complete the logout process.

As described in the background section, there are two primary problems with DNS-based captive portals in use today: 1) they do not work when a non-logged in user accesses an external destination by IP address rather than domain name, and 2) an incorrect IP address may be cached on the user's device as resolving to an external website even after the user has successfully logged in.

Concerning the first problem, the gateway/firewall 118 of FIG. 1 is configured with a default Internet access rule 724 (see FIG. 7) that prevents all non-logged in user devices 117 from accessing non-cleared websites(s) 108 on the Internet 104. In this way, when a non-logged in user device 117 attempts to access a non-cleared websites 108 using the IP address of the non-cleared website, the connection request or other traffic from the non-logged in user device 117 is dropped by the gateway/firewall 118 in compliance with the default Internet access rule 724. The inventors of the present invention anticipate that most users will try a popular domain-based URL such as "google.com" in order to test if their computer is connected to the Internet upon failing to access an IP-based destination. For this reason, besides configuring the gateway/firewall 118 to prevent non-logged in user devices 117 from accessing non-cleared websites 108 on the Internet 104 (see firewall 118's default Internet access rule 724 in FIG. 7), no other techniques are utilized in this embodiment to cause IP-based access requests from non-logged in user devices 117 to display the login portal.

Concerning the second problem that the logged in user devices 116 may still cache an incorrect IP address for the domain name of a (non-cleared 108) website, the captive portal server 102 in the embodiment of FIG. 1 acts a transparent proxy 126 in the event that the login web server 128 receives from a logged in user device 117 an HTTP request for another host such as a non-cleared website 108 on the Internet 104. In this way, immediately after successful login, users are able to access all non-cleared websites 108 without having to wait for their web browser's cached IP addresses to timeout and without having to restart the web browser in order force it to clear its cached IP addresses. User convenience is thereby increased.

Another benefit of the captive portal server 102 of FIG. 1 is that it prevents non-logged in user devices 117 from escaping the captive portal via the DNS protocol. In some prior art captive portals that preform browser redirection using an intermediate gateway device, it is still possible for a non-logged in user device to tunnel out to the Internet using the domain name system (DNS) protocol. In some prior art implementations, DNS requests from a non-logged in user device 117 will be passed out to the Internet and responses will be passed back to the non-logged in user device. A hacker can therefore disguise their traffic as DNS requests/responses (e.g., by using port 53 for DNS instead of ports 80 and 443 for HTTP and HTTPS, respectively) and thereby escape the captive portal. In other prior art implementations, DNS requests are handled locally within the captive portal but will involve the local DNS server communicating with external DNS servers on the Internet such as to retrieve records and other information for an unknown domain name. To escape such captive portals, a hacker can setup a rogue DNS server on the Internet with a specific domain name and tunnel Internet traffic to and from this rogue DNS server via the local DNS server.

The captive portal server 102 of FIG. 1 beneficially overcomes these problems of prior art captive portals because non-logged in user devices 117 have their DNS traffic routed to a special name server 138 specifically designed to resolve all not specifically cleared domain names to the IP address of the login web server 128. In this way, DNS traffic from a non-logged in user device 117 is not routed to the Internet 104 either directly or indirectly; therefore, it is not possible for a non-logged in user device 117 to tunnel web traffic to/from the Internet 104 using the DNS protocol in these embodiments of the present invention. Furthermore, even if the user's computer is set to use OpenDNS or another external DNS provider, the firewall/gateway rules 600 will redirect all DNS requests from non-logged in user devices 117 to the specified DNS server 134 so the captive portal will still function properly.

Another advantage enabled by certain embodiments of the present invention is that a browser 3XX redirection message is not required (although one could still be utilized at step 316 if desired). In a typical approach to captive portals, when a user tries to go to the URL or address of a first web site, an intermediate gateway pretends to be the desired website by performing a TCP connection handshake with the user's computer using the IP address of the site to which the user's computer is attempting to connect. After establishing the connection with the user's computer, the gateway sends a web browser an HTTP 3XX browser redirection message to automatically cause the user's web browser to redirect to a different URL or IP address than originally requested. For example, to redirect to a login webpage. One problem with this conventional approach is that automatic browser redirection often annoys users, and some browsers may be configured to block or ignore browser redirect messages so the above-described redirection will fail. Embodiments of the present invention can be utilized to solve this problem by not requiring a browser redirection message to be sent at step 316.

In an exemplary embodiment of the invention, a captive portal system includes a login database, a web server, and a name server. The name server receives a DNS request from a user device, queries the login database to determine whether the user device is logged in, and responds to the DNS request with the IP address of the web server as a resolved IP address of the specified domain name when the user device is not logged in. The web server accepts a connection request from the user device to the IP address of the web server, receives an HTTP request specifying a non-local target URL from the user device, queries the login database to determine whether the user device is logged in according to the source address of the user device, and acts as a transparent proxy between the user device and the non-local target URL when the user device is logged in.

Although the invention has been described in connection with preferred embodiments, it should be understood that various modifications, additions and alterations may be made to the invention by one skilled in the art without departing from the spirit and scope of the invention as defined in the appended claims. For example, in another configuration of the invention, one or more of the gateway/firewall 118, encryption module 124, transparent proxy 126, cleared sites list 139, first name server 136, second name server 138, login database 130, and/or login web server 128 may be implemented as an external device having its own processor(s), network interface(s), storage medium/media, and other necessary hardware components.

In another example, rather than (or in addition to) closing the connection with the client device 138 at step 230, the web server 128 includes at step 316 a connection header in the HTTP response having one or more directives set to prevent the browser on the client device 117 from holding the connection open after receiving the HTTP response. For example, the web server 128 may include an HTTP response header such as: "Connection: close", which indicates to the client device 117 that the connection is not a persistent connection and should therefore be closed after receiving the HTTP response. Either or both of including a connection header at step 316 and/or closing the connection at step 320 may be employed by the web server 128 to cause the connection with the client device 117 to be closed after replying to the client device with the HTTP response and before a subsequent HTTP request is received from the client device over the same connection.

In the above description, the exemplary user indication of "guest" is utilized to refer to users as it common for customers of a hospitality establishment to be referred to as guests. However, it is not a requirement that the guests must be customers of the hospitality establishment and the term guest in this description includes other users such as current guests in the hotel, people who are attending a conference or meeting in the hotel, staff members at the hotel, or any other person or user who may need or want to access a network service over a computer network at the hospitality establishment. Future guests that have reservations, potential future guests that don't yet have reservations, and other users may also be given access to the network service on their guest devices. For example, a demonstration of the technology may be available in a hotel lobby guest area and all users would be able to try out the system 100 in order access the Internet 104. Additionally, it is not necessary that the users bring their own user devices 116, 117. In another configuration, one or more of the user devices 116, 117 may be provided to the user by the hotel. It should also be noted that although portable devices that are easily carried are anticipated by the inventors as being particularly useful as user devices 116, 117, it is not a strict requirement that the user devices 116, 117 be easily carried. Other devices such as desktop computers that are of a more permanent nature may also act as user devices 116, 117 in conjunction with the invention.

A problem with convention DNS-based captive portals is that the user's web browser caches the login server's IP for external websites and then these websites do not work after the user has logged in and should have gained access to the websites. In the above embodiments, the transparent proxy operation 126 of the login server 126 for logged in guest devices 116 allows logged in guest devices 116 to access target URLs even when a logged in guest device has cached the wrong IP address for the host domain name of the target URL.

Although the invention has been described as being utilized at a hotel for illustration purposes, the present invention is equally applicable to any hospitality related location or service wishing to cause users to display a login portal or other designated web page including but not limited to hotels, motels, resorts, hospitals, apartment/townhouse complexes, restaurants, retirement centers, cruise ships, busses, airlines, airports, shopping centers, passenger trains, libraries, coffee shops, hotspots, etc. Additionally, the invention is applicable to situations where a captive portal is required including other typical home and corporate usages in addition to the above described hospitality examples.

The various separate configurations, elements, features, embodiment, and modules of the invention described above may be integrated or combined. The modules may be executed by one or more processors 116 operating pursuant to instructions stored on a tangible, non-transitory computer-readable medium 122 to perform the above-described functions of any or all aspects of the captive portal server 102. Examples of the tangible, non-transitory computer-readable medium include optical media (e.g., CD-ROM, DVD discs), magnetic media (e.g., hard drives, diskettes), and other electronically readable media such as flash storage devices and memory devices (e.g., RAM, ROM). The computer-readable medium may be local to the computer executing the instructions, or may be remote to this computer such as when coupled to the computer via a computer network. The processors 120 may be included in a general-purpose or specific-purpose computer that becomes the captive portal server 102 as a result of executing the instructions. In another example, rather than being software modules executed by one or more processors 120, the various modules such as gateway/firewall 118, encryption module 124, transparent proxy 126, login web server 128, DNS server 134, etc. may be implemented as hardware modules such as application specific integrated circuits (ASICs) or other types of programmable hardware such as gate arrays configured to perform the above-described functions. Functions of single modules may be separated into multiple units, or the functions of multiple modules may be combined into a single unit. Unless otherwise specified, features described may be implemented in hardware or software according to different design requirements. In addition to a dedicated physical computing device, the word "server" may also mean a service daemon on a single computer, virtual computer, or shared physical computer or computers, for example. Additionally, all suitable combinations and permutations of the above described features and configurations may be utilized in conjunction with the invention.

What is claimed is:

1. A captive portal system for controlling access from user devices to an external network, the captive portal system comprising:
 a storage device storing a login database, the login database specifying source addresses of user devices that are currently logged in;
 a web server coupled to the storage device and a computer network, and configured with an IP address accessible on the computer network; and
 a name server coupled to the storage device and the computer network, and operable to resolve domain names to IP addresses;
 wherein the name server is configured to:
  receive a DNS request from a user device to resolve a target domain name;
  query the login database to determine whether the user device is logged in according to a source address of the user device;
  respond to the DNS request with the IP address of the web server as a resolved IP address of the target domain name when the user device is not logged in; and
  respond to the DNS request with a correct IP address of the target domain name in response to the name server determining that the user device is logged in; and
 the web server is configured to:

accept a connection request from the user device to the IP address of the web server, the connection request to the IP address of the web server occurring as a result of the name server previously determining the user device to not be logged in and the user device caching the IP address of the web server provided by the name server as the resolved IP address of the target domain name;

receive an HTTP request specifying a non-local target URL from the user device over the connection, wherein the non-local target URL is not a URL provided by the web server;

query the login database to determine whether the user device is logged in according to the source address of the user device;

respond to the HTTP request by acting as a transparent proxy between the user device and the non-local target URL to thereby allow the user device to receive content of the non-local target URL in response to the web server determining that the user device is logged in; and respond to the HTTP request with alternate content different than that provided at the non-local target URL when the user device is not logged in.

2. The captive portal system of claim 1, wherein:
the storage device further stores a list of cleared sites; and
the name server is further configured to determine whether the target domain name is a cleared site and to respond to the DNS request with the correct IP address of the target domain name in response to the name server determining that the target domain name is a cleared site.

3. The captive portal system of claim 1, wherein:
the storage device further stores a list of cleared sites; and
the web server is further configured to determine whether the non-local target URL is a cleared site and to respond to the HTTP request by acting as the transparent proxy between the user device and the non-local target URL to thereby allow the user device to receive the content of the non-local target URL in response to the web server determining that the non-local target URL is a cleared site.

4. The captive portal system of claim 1, wherein the alternate content is a browser redirection message causing a web browser running on the user device to automatically redirect to a login portal.

5. The captive portal system of claim 1, wherein the alternate content is a first page of content from a login portal.

6. The captive portal system of claim 1, wherein the alternate content is a splash page with a user-clickable link or button to a login portal.

7. The captive portal system of claim 1, wherein the web server is further configured to:
retrieve original content from another web server; and
generate the alternate content by modifying the original content retrieved from the other web server.

8. The captive portal system of claim 1, wherein:
the HTTP request is received from the user device over a secure connection and specifies a non-local HTTPS target URL; and
the web server is further configured to decrypt and re-encrypt data while acting as the transparent proxy between the user device and the non-local target URL to thereby allow the user device to receive the content of the non-local HTTPS target URL in response to the web server determining that the user device is logged in.

9. The captive portal system of claim 1, further comprising a firewall configured with rules to redirect all DNS queries received from the user device to the name server.

10. The captive portal system of claim 9, wherein:
the name server comprises a first name server for logged in devices, and a second name server for non-logged in devices; and
the firewall is configured with rules to redirect all DNS queries from logged in user devices to the first name server, and to redirect all DNS queries received from non-logged in user devices to the second name server.

11. The captive portal system of claim 1, further comprising a firewall configured with a default rule to block all traffic from non-logged in user devices to non-cleared addresses on the external network.

12. A method of controlling access within a captive portal from user devices to an external network, the method comprising:
tracking in a login database source addresses of user devices that are currently logged in;
receiving, by a name server, a DNS request from a user device to resolve a target domain name;
querying, by the name server, the login database to determine whether the user device is logged in according to a source address of the user device;
responding, by the name server, to the DNS request with an IP address of a web server accessible to the user device from within the captive portal as a resolved IP address of the target domain name when the user device is not logged in;
responding, by the name server, to the DNS request with a correct IP address of the target domain name in response to the name server determining that the user device is logged in;
accepting, by the web server accessible to the user device from within the captive portal, a connection request from the user device to the IP address of the web server, the connection request to the IP address of the web server occurring as a result of the name server previously determining the user device to not be logged in and the user device caching the IP address of the web server provided by the name server as the resolved IP address of the target domain name;
receiving, by the web server, an HTTP request specifying a non-local target URL from the user device over the connection, wherein the non-local target URL is not a URL provided by the web server;
querying, by the web server, the login database to determine whether the user device is logged in according to the source address of the user device;
responding, by the web server, to the HTTP request by acting as a transparent proxy between the user device and the non-local target URL to thereby allow the user device to receive content of the non-local target URL in response to the web server determining that the user device is logged in; and
responding, by the web server, to the HTTP request with alternate content different than that provided at the non-local target URL when the user device is not logged in.

13. The method of claim 12, further comprising redirecting all DNS queries received from the user device to the name server.

14. The method of claim 13, wherein:
the name server comprises a first name server for logged in devices, and a second name server for non-logged in devices; the method further comprising:

redirecting all DNS queries from logged in user devices to the first name server; and redirecting all DNS queries received from non-logged in user devices to the second name server.

15. A non-transitory computer-readable medium comprising computer executable instructions that when executed by one or more computers cause the one or more computers to perform a method of controlling access within a captive portal from user devices to an external network, the method comprising:

tracking in a login database source addresses of user devices that are currently logged in;

receiving, by a name server, a DNS request from a user device to resolve a target domain name;

querying, by the name server, the login database to determine whether the user device is logged in according to a source address of the user device;

responding, by the name server, to the DNS request with an IP address of a web server accessible to the user device from within the captive portal as a resolved IP address of the target domain name when the user device is not logged in;

responding, by the name server, to the DNS request with a correct IP address of the target domain name in response to the name server determining that the user device is logged in;

accepting, by the web server accessible to the user device from within the captive portal, a connection request from the user device to the IP address of the web server, the connection request to the IP address of the web server occurring as a result of the name server previously determining the user device to not be logged in and the user device caching the IP address of the web server provided by the name server as the resolved IP address of the target domain name;

receiving, by the web server, an HTTP request specifying a non-local target URL from the user device over the connection, wherein the non-local target URL is not a URL provided by the web server;

querying, by the web server, the login database to determine whether the user device is logged in according to the source address of the user device;

responding, by the web server, to the HTTP request by acting as a transparent proxy between the user device and the non-local target URL to thereby allow the user device to receive content of the non-local target URL in response to the web server determining that the user device is logged in; and responding, by the web server, to the HTTP request with alternate content different than that provided at the non-local target URL when the user device is not logged in.

16. A computer server in a captive portal system, the computer server comprising:

a first network interface coupled to a local computer network;

a second network interface coupled to an external computer network;

a memory device storing software instructions; and one or more processors coupled to the memory device;

wherein, by the one or more processors executing the software instructions loaded from the memory device, the one or more processors are configured to:

receive a DNS request from a user device on the local computer network to resolve a target domain name on the external computer network;

query a login database to determine whether the user device is logged in at a time of the DNS request according to a source address of the user device;

respond to the DNS request with an IP address of the computer server as a resolved IP address of the target domain name when the user device is not logged in at the time of the DNS request;

respond to the DNS request with a correct IP address of the target domain name in response to determining that the user device is logged in at the time of the DNS request;

accept a connection request from the user device on the local computer network to the IP address of the computer server, the connection request coming sometime after the DNS request, the connection request to the IP address of the web server occurring as a result of the name server previously determining the user device to not be logged in and the user device caching the IP address of the web server provided by the name server as the resolved IP address of the target domain name;

receive an HTTP request specifying a non-local target URL from the user device over the connection, wherein the non-local target URL is not a URL provided by the computer server;

query the login database to determine whether the user device is logged in at a time of the HTTP request according to the source address of the user device;

respond to the HTTP request by acting as a transparent proxy between the user device and the non-local target URL to thereby allow the user device to receive content of the non-local target URL in response to determining that the user device is logged in at the time of the HTTP request; and respond to the HTTP request with alternate content different than that provided at the non-local target URL when the user device is not logged in at the time of the HTTP request.

17. The computer server of claim 16, further comprising:

a storage device storing a list of cleared sites;

wherein the one or more processors are further configured to check whether the target domain name is a cleared site and to respond to the DNS request with the correct IP address of the target domain name in response to determining that the target domain name is a cleared site.

18. The computer server of claim 16, wherein the alternate content is selected from the group consisting of:

a browser redirection message causing a web browser running on the user device to automatically redirect to a login portal;

a first page of content from the login portal; and a splash page with a user-clickable link or button to the login portal.

19. The computer server of claim 16, wherein the one or more processors are further configured to:

retrieve original content from another web server; and generate the alternate content by modifying the original content retrieved from the other web server.

20. The computer server of claim 16, wherein:

the HTTP request is received from the user device over a secure connection and specifies a non-local HTTPS target URL; and the one or more processors are further configured to decrypt and re-encrypt data while acting as the transparent proxy between the user device and the non-local target URL to thereby allow the user device to receive the content of the non-local HTTPS target URL in response to determining that the user device is logged in at the time of the HTTP request.

\* \* \* \* \*